United States Patent
Tremblay et al.

(10) Patent No.: US 12,083,557 B2
(45) Date of Patent: Sep. 10, 2024

(54) SURFACE PROPERTIES MODIFICATION OF DIGITALLY MANUFACTURED ARTICLES VIA REACTIVE SILICON-CONTAINING PRECURSOR POLYMERS

(71) Applicant: 3DFortify, Inc., Boston, MA (US)

(72) Inventors: Noah Tremblay, Pepperell, MA (US); Randall M. Erb, Newton, MA (US); Joshua J. Martin, Arlington, MA (US)

(73) Assignee: 3DFortify, Inc., Boston, MA (US)

( * ) Notice: Subject to any disclaimer, the term of this patent is extended or adjusted under 35 U.S.C. 154(b) by 336 days.

(21) Appl. No.: 17/639,148

(22) PCT Filed: Aug. 28, 2020

(86) PCT No.: PCT/US2020/048414
§ 371 (c)(1),
(2) Date: Feb. 28, 2022

(87) PCT Pub. No.: WO2021/041815
PCT Pub. Date: Mar. 4, 2021

(65) Prior Publication Data
US 2022/0314273 A1   Oct. 6, 2022

Related U.S. Application Data

(60) Provisional application No. 62/894,120, filed on Aug. 30, 2019.

(51) Int. Cl.
*B05D 5/08* (2006.01)
*B05D 1/02* (2006.01)
(Continued)

(52) U.S. Cl.
CPC .............. *B05D 5/08* (2013.01); *B05D 1/02* (2013.01); *B05D 3/007* (2013.01); *B05D 3/04* (2013.01);
(Continued)

(58) Field of Classification Search
CPC . B05D 5/08; B05D 1/02; B05D 3/007; B05D 3/04; B05D 2518/10; B29C 64/153;
(Continued)

(56) References Cited

U.S. PATENT DOCUMENTS

| | | | |
|---|---|---|---|
| 6,756,115 | B2 | 6/2004 | Fu et al. |
| 7,087,536 | B2 | 8/2006 | Nemani et al. |

(Continued)

FOREIGN PATENT DOCUMENTS

| | | |
|---|---|---|
| JP | H0745605 | 2/1995 |
| JP | H1060142 A | 3/1998 |

(Continued)

OTHER PUBLICATIONS

European Supplemental Search Report and Written Opinion for Application No. 20859449, dated Aug. 24, 2023 (10 pages).

(Continued)

*Primary Examiner* — Nathan T Leong
(74) *Attorney, Agent, or Firm* — Barnes & Thornburg LLP

(57) ABSTRACT

Methods for forming a coated digitally manufactured part include forming an article by a digital manufacturing method; coating a surface of the article with a reactive silicon-containing precursor polymer; and treating the polymer to form a silica-containing coating, thereby forming the coated digitally manufactured part. An article includes a digitally manufactured part having surface striations; and a coating encapsulating the digitally manufactured part and comprising silica. An article includes a digitally manufactured part (i) formed by selective lase sintering, (ii) comprising a surface defined by coalesced particles, and (iii)

(Continued)

having a surface roughness $R_a$ of at least 0.1 microns; and a coating encapsulating the part and comprising silica. A composition comprising polysilazane is described.

19 Claims, 3 Drawing Sheets

(51) Int. Cl.
| | |
|---|---|
| *B05D 3/00* | (2006.01) |
| *B05D 3/04* | (2006.01) |
| *B29C 64/153* | (2017.01) |
| *C08K 3/013* | (2018.01) |
| *C08K 3/36* | (2006.01) |
| *C09D 7/20* | (2018.01) |
| *C09D 7/61* | (2018.01) |
| *C09D 183/16* | (2006.01) |

(52) U.S. Cl.
CPC .......... *B29C 64/153* (2017.08); *C08K 3/013* (2018.01); *C08K 3/36* (2013.01); *C09D 7/20* (2018.01); *C09D 7/61* (2018.01); *C09D 183/16* (2013.01); *B05D 2518/10* (2013.01)

(58) Field of Classification Search
CPC .......... C09D 7/61; C09D 7/20; C09D 183/16; C08K 3/013; C08K 3/36
See application file for complete search history.

(56) References Cited

U.S. PATENT DOCUMENTS

| | | | |
|---|---|---|---|
| 9,477,346 | B2 | 10/2016 | Sirois |
| 9,815,943 | B2 | 11/2017 | Sherwood et al. |
| 2014/0011009 | A1 | 1/2014 | Fish |
| 2018/0043618 | A1 | 2/2018 | Shemelya et al. |
| 2019/0061236 | A1* | 2/2019 | Rantala .................... C08K 3/08 |

FOREIGN PATENT DOCUMENTS

| | | |
|---|---|---|
| JP | 2003253207 A | 9/2003 |
| JP | 2003347294 A | 12/2003 |
| JP | 2004075459 A | 3/2004 |
| JP | 2004155834 A | 6/2004 |
| JP | 2006089674 A | 4/2006 |
| JP | 2008089859 A | 4/2008 |
| WO | 2019065035 A1 | 4/2019 |
| WO | 2021041815 A1 | 3/2021 |

OTHER PUBLICATIONS

International Search Report and Written Opinion for Application No. PCT/US2020/048414, dated Mar. 4, 2021 (12 pages).
Stevenson, Kerry, "The Startling Magnetic 3D Print Technology from Fortify Fabbaloo," dated May 29, 2019, XP093072813, pp. 1-11.

* cited by examiner

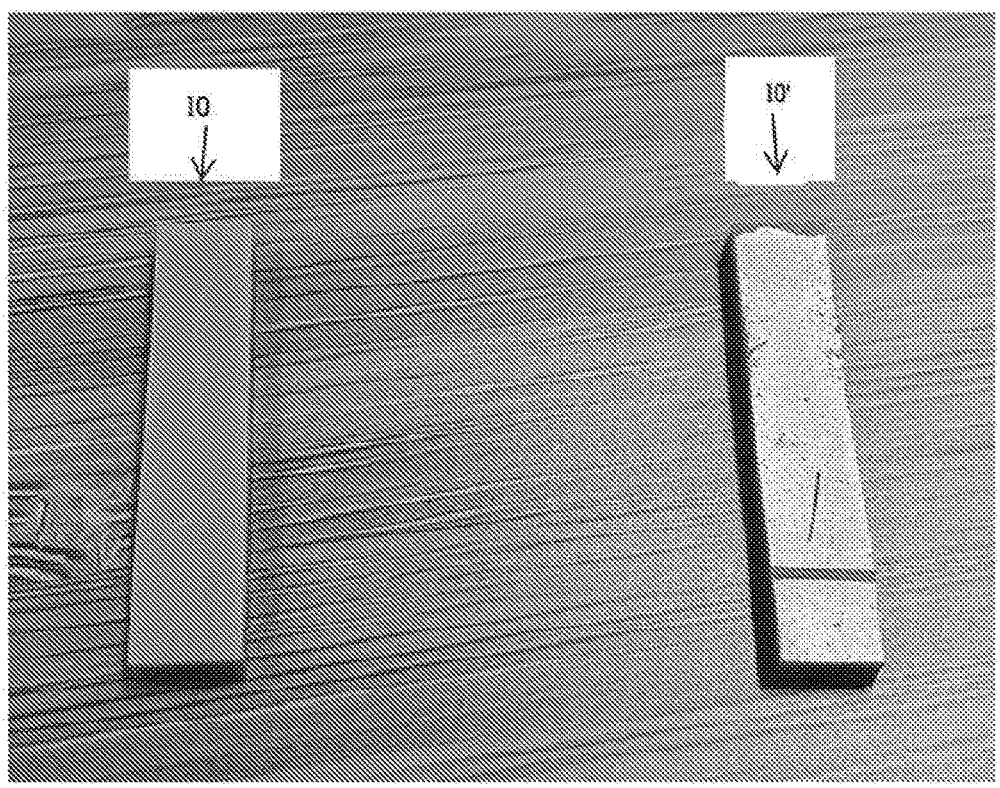
Figure 1
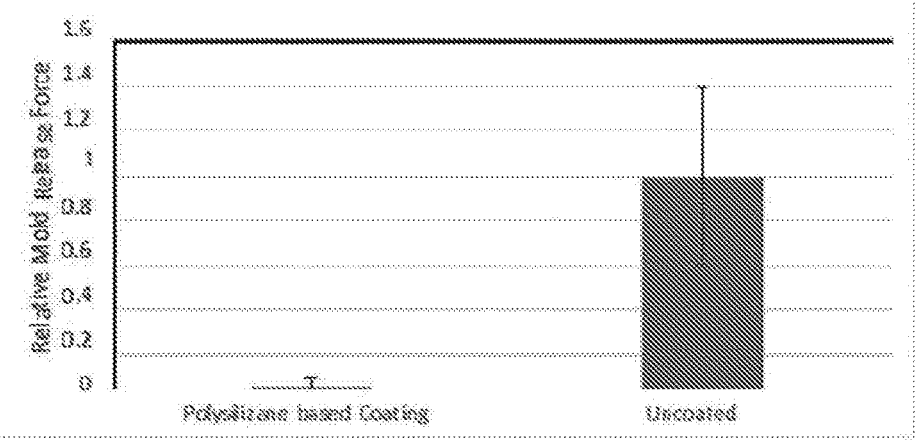
Figure 2. Reduction of the release force of an injected part from a 3D printed mold in a variety of cases.

SURFACE PROPERTIES MODIFICATION OF DIGITALLY MANUFACTURED ARTICLES VIA REACTIVE SILICON-CONTAINING PRECURSOR POLYMERS

CROSS-REFERENCE TO RELATED APPLICATION

This application is a U.S. national stage filing from International Application No. PCT/US2020/048414, filed Aug. 28, 2020, which claims priority to and the benefit of U.S. Provisional Patent Application Ser. No. 62/894,120, filed Aug. 30, 2019, the disclosure of which are hereby incorporated by reference in their entireties.

FIELD OF THE INVENTION

Embodiments of the invention relate generally to digital manufacturing, particularly to materials and methods for surface property modification.

BACKGROUND

Objects formed by digital manufacturing, e.g., 3D printed objects, are typically made from a single homogeneous material with one or more constituents. The material is generally selected and modified based on optimizing bulk mechanical, thermal, or electrical properties. The 3D printing industry is now starting to achieve bulk mechanical properties that are sufficient for end use parts, which have higher standards than prototypes or non-functional objects. With the onset of this emerging industry, i.e., digital manufacturing of end use parts, more attention is being paid to the surface properties of these end use parts to achieve the expected metrics for scratch resistance, cleanability, chemical/solvent resistance, anti-stick, anti-fouling, thermal conductivity, and electrical conductivity. The two main aspects of the surface, structure and chemistry, dictate the functionality of that surface in different use cases.

The structural aspects of the surface of 3D printed objects are largely dictated by the type of printing process used to create the object. Layer-by-layer 3D printing processes typically produce parts with some degree of roughness, emerging from the layered nature of the object. Striations between layers can be observed in printed objects and are dictated largely by the inherent resolution of the particular 3D printing process used to create the object. For example, the resolution of digital light projector (DLP) printing is limited to the resolution of the particular DLP projector used in the printing process, which is generally about 35 microns-150 microns. Certain systems can improve this resolution, but striation is still evident. Such striation or surface roughness is either clearly seen by eye (large and small roughness) or results in a matte finish to the part (small roughness only). In addition to surface finish, the materials selected for bulk strength or properties otherwise are usually not ideal for achieving desired surface properties.

The chemical aspects of the surface of 3D printed objects are largely dictated by the material used in the printing process, i.e., the ink. It is very difficult to change the surface properties in that case without also significantly changing how the material prints and how the printed material performs mechanically in the bulk.

Both the structural aspects and the chemical aspects of the surface properties of 3D printed objects dictate how useful the object is for a particular end use case. One application in which this level of surface property control is particularly relevant is the emerging industry of 3D printing injection mold tools. For injection mold tools, the surface finish, mechanics, and chemistry are especially important and relevant when releasing a molded portion of hot plastic, as the hot plastic has a tendency to stick to the mold if the surface properties are not optimized.

Currently, many companies are using 3D printing to print injection molding tools for use in the injection molding of parts for mass production. However, 3D printed parts suffer from challenging surface properties that make releasing the molded part difficult, such as striations due to the printing process, porosity due to the particle-nature of the feedstock used to print the mold, Hansen solubility parameters similar to those of moldable plastics, and printed inks that soften at elevated temperatures. This is especially critical in stereolithography apparatus (SLA)/DLP systems in which the printed parts tend to have good chemical interaction (similar Hansen solubility parameters) with injected plastics. This good chemical interaction can result in parts sticking to an SLA/DLP printed mold. A release spray is often employed to help provide an anti-stick surface for molding. These sprays can sometimes not work at all, work for a little while then not work, degrade the printed part, or require an unrealistic amount of recoating/respraying.

Some coatings are available for traditionally milled and polished steel and aluminum injection molds, however these are limited in scope due to a lack of necessity, as the polished metal surface has excellent release properties when paired with traditional release sprays. Coating offerings include polyvinyl alcohol (PVA)-based, silicone-based, Teflon™-based coatings, and nanocomposite-based. Generally, these coatings may require special equipment for application, or they may not be optimized for the challenging surface properties of 3D printing objects. In most cases, the coatings are designed to be sacrificial and the ease by which the coating is applied is proportional to how often one has to re-coat the tool.

A general surface property modifying coating for 3D printed object is the product XTC-3D™ protective epoxy coating (by Smooth-on) for smoothing and finishing 3D printed parts. See https://www.smooth-on.com/products/xtc-3d/ The XTC-3D™ product is an epoxy-based coating that is typically very thick (0.5-2 mm thick). On the other hand, for tooling, a thin coating is preferred, as the dimensions preferably do not change significantly.

Slik Shot® by Nutmeg Chrome Corporation is a Teflon® particle and nickel electroless plating process that yields a nickel-Teflon® composite coating with great anti-stick properties. See http://nutmegchrome.com/page/slik-shot-electroless-plated-coating. This coating has been applied to injection mold tools but is only relevant for metal tools. The coating may not perform well on composite or resin tools because the coating does not adhere to resin. Also, the electroless plating process is an involved process that cannot be easily performed by end users. Furthermore, Slik Shot® may also require a polishing step, depending on the thickness of application.

Nanocomp coating by CeraNovis is a nanoparticle based coating that is applied directly to the tool and baked on. It goes on very thin but may stick to resin based materials, and does not offer porosity and surface roughness modification. This coating ranges between 20 microns and 80 microns, with the higher end greatly limiting the resolution of the mold.

SUMMARY

For most end-use applications in digital manufacturing, having the freedom to determine the bulk and surface properties separately offers a huge advantage to creating a targeted product solution. Embodiments of the invention include a thin film that is rigid and durable. The thin coating has excellent adhesion to the substrate and has excellent materials properties (high strength and stiffness) even at the target thickness. The thin coating can be applied to (and can adhere to) metal and polymer (resin)-based parts and tools, as well as dielectrics, ceramics, and semiconductors. The coating process is straightforward to implement, not requiring extensive education and tooling.

Embodiments of the invention address the problem of needing to modify the surface properties of digitally manufactured parts by utilizing a coating paradigm that relies on the unique chemistry of reactive silicon-containing precursor polymers, e.g., polysilazane- and silazane-containing polymers. Polysilazanes are soluble polymers that form very thin and uniform coatings on a multitude of surfaces, fill in pores and smooth out surface roughness, and react with water and oxygen after coating to form a dense and hard silica-based coating. The final silica-based coating can be modified in a straightforward manner by adding solvents, particles, polymers, or functionalized silanes/siloxanes to the base coating formula. Through simple formulation from the base coating, one can enable a very wide variety of chemical properties and structural properties.

In the case of injection mold tools, perhydropolysilazane can be diluted with solvent and applied with no additives to achieve a silica surface that aids molding and works well with traditional release sprays to easily release plastic parts. In this case, the coating smooths out layer lines, fills in defects and small holes, creates an excellent high-temperature stable surface, and results in a silica surface chemistry that does not wet plastics or release spray chemistries very well at all. In addition, the coating modifies the surface roughness which translates to more ideal aesthetics and can dissipate localized stress concentrations at the surface that lead to premature failure both local to the surface (e.g., chipping) or of the entire part (e.g., part fracture from a surface crack). Accordingly, smoother surfaces help the mechanical robustness of parts as the stress concentrations that exist at the surface during usage are reduced.

To date, polysilazanes have not been applied to digitally manufactured articles, especially to 3D printed injection mold tooling. The primary reason is that many injection mold tool materials cannot handle the high pressures and temperatures that make the sticking of plastic parts so troublesome. Newly developed materials, however, such as Fortify's ceramic reinforced resins such as its digital tooling composite resin, can withstand these higher temperatures and pressures, that when printed into injection mold tools, benefit greatly from polysilazane-based coatings. In general, 3D printing technologies have not paid much attention to surface properties and only employ specific coatings for specific applications, polysilazane-based coatings, not being one of them.

The coatings described herein do not require recoating and are designed to work on their own as release coatings and in cooperation with traditional silicone release sprays. The coating in accordance with embodiments of the invention are stable at higher temperatures. In the case of coated injection molding tools, the coatings may provide additional advantages, such as a low interaction with injected polymers, and are compatibility with various release agents. Another suitable application is for parts for the aerospace and automotive industries: the smoothness and chemical functionality of the coatings enables easy cleaning, anti-fouling, and anti-ice properties both in an absolute sense and relative to an, e.g., native resin or native sintered powder surface.

In an aspect, embodiments of the invention relate to a method for forming a coated digitally manufactured part. The method includes forming an article by a digital manufacturing method; coating a surface of the article with a reactive silicon-containing precursor polymer; and treating the polymer to form a silica-containing coating, thereby forming the coated digitally manufactured part.

One or more of the following features may be included. The digital manufacturing method may be additive manufacturing and/or laminated object manufacturing. Additive manufacturing may include vat polymerization, material extrusion, binder jetting, powder bed fusion, and/or material jetting. Laminated object manufacturing may include selective deposition lamination, wet lamination, dry lamination, wax lamination, and/or solventless lamination.

Forming the article may also include subtractive manufacturing, e.g., CNC milling, laser engraving, and/or negative photoresist polymer lithography.

The article may include a material such as metal, polymer, dielectric, ceramic, and/or semiconductor.

Coating the surface may include vapor deposition, solution deposition, and/or application of solid material.

The reactive silicon-containing precursor polymer may include a silazane-containing polymer and/or a siloxane-containing polymer.

The reactive silicon-containing precursor polymer may include a solid powder and/or a liquid. It may include polysilazane dissolved in a solvent. It may include a second solvent, e.g., a reactive silicone or an unreactive silicone.

The reactive silicon-containing precursor polymer may include a particulate additive, such as silica-, ceramic-, and/or metal-oxide based particles. The particulate additive may be silica spheres and/or chopped glass fibers.

The reactive silicon-containing precursor polymer may include a chemistry modifier, such as functional silane.

The reactive silicon-containing precursor polymer may include a pigment, such as cobalt oxide, titanium dioxide, iron oxide, copper flake, and/or carbon black.

The reactive silicon-containing polymer may include a rheology modifier.

The coating may have a thickness 1 nm to 500 microns, e.g., 250 nm to 75 microns, or 1 micron to 50 microns.

Treating the polymer may include exposing the polymer to an oxygen-containing humid environment for a predetermined time and temperature.

The coating may have a hardness of 4 GPa to 30 GPa. The coating may have a surface roughness $R_a$ of 0.5-25 microns. The coating may have a water wettability contact angle of 90-180°.

The coating may include silica.

In another aspect, embodiments of the invention relate to an article including a digitally manufactured part having surface striations; and a coating encapsulating the digitally manufactured part and including silica.

One or more of the following features may be included. The surface striations may have an average height selected from a range of 250 nm to 100 microns.

The coating may have a thickness selected from a range of 1 nm to 500 microns, e.g., 250 nm micron to 75 microns or 1 micron to 50 microns.

The coating may have a hardness of 4 GPa-30 GPa. The coating may have a surface roughness $R_a$ of 0.1 to 10 microns.

The coating may have a water wettability contact angle of 90°-180°.

In yet another aspect, embodiments of the invention relate to an article including a digitally manufactured part (i) formed by selective laser sintering, (ii) comprising a surface defined by coalesced particles, and (iii) having a surface roughness $R_a$ of at least 0.1 microns; and a coating encapsulating the digitally manufactured part and including silica.

In still another aspect, embodiments of the invention relate to a composition including 1 wt % to 99 wt % polysilazane, which includes perhydropolysilazane in di-n-butyl ether; and 1 wt % to 99 wt % a solvent comprising methyl ethyl ketone.

In another aspect, embodiments of the invention relate to a composition including 1 wt % to 99 wt % polysilazane, which includes perhydropolysilazane in di-n-butyl ether; 1 wt % to 99 wt % solvent comprising methyl ethyl ketone; and 0.1 wt % to 15 wt % additive comprising bis(triethoxysilane) perfluoropolyether.

BRIEF DESCRIPTION OF THE FIGURES

FIG. 1 is a photograph of a part produced via DLP composite additive manufacturing (uncoated) and a photograph of a coated version of the same part, coated in accordance with an embodiment of the invention. The coated part has a glossier finish and more mechanical robustness.

FIG. 2 is a graph illustrating a typical reduction of the release force of an injected article from a 3D printed mold, coated in accordance with an embodiment of the invention, in comparison to an uncoated 3D printed mold.

DETAILED DESCRIPTION

Figure 3:
FIG. 3 is a photograph of a coated injection mold tool insert, displaying a glossy sheen, manufactured in accordance with an embodiment of the invention.

As used herein, digital manufacturing means translation of a digital design to a physical object by way of a printing process (layer-by-layer). Digital manufacturing includes 3D printing.

As used herein, reactive silicon-containing precursor polymer means a polymer or polymer solution that contains silicon atoms in the structure of the polymer and is adapted to react to form a new material.

As used herein, silane means any derivative of an inorganic compound with four substituents on silicon.

As used herein, siloxane means a molecule containing a silicon atom bonded to an oxygen atom bonded to another silicon atom.

As used herein, silazane means a polymer in which silicon and nitrogen atoms alternate to form the basic backbone.

Many metals, glass, ceramics or plastics with OH groups on the surface are easily wetted by polysilazanes. Reaction of Si—N with OH leads to the formation of Si—O-metal bonds generating good adhesion of the coating to the substrate. The free surface of the coating can react with humidity thereby creating a siloxane-like structure with excellent easy to clean properties.

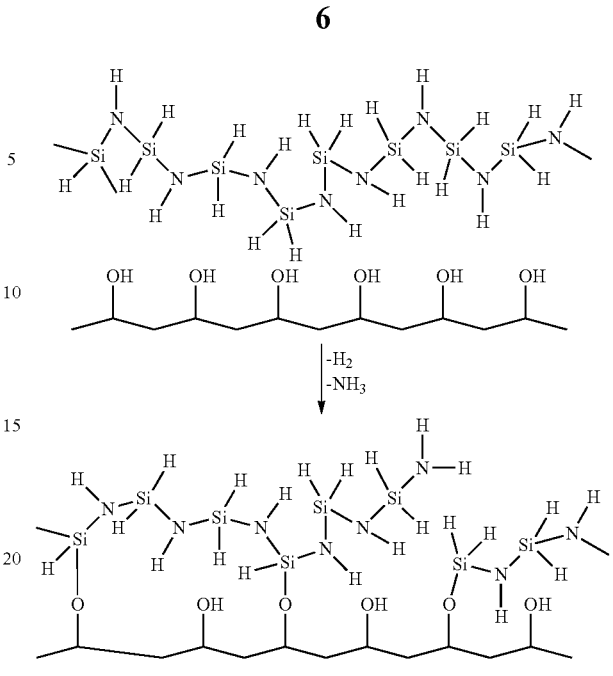

Polysilazane Adhesion on Polar Surface (Wikipedia—Polysilazane)

A family of coatings for 3D printed articles is described. These coatings may be applied to different materials, such as metal, polymer, dielectric, ceramic, and/or semiconductor, and may be used for various applications, such as for coating 3D printed injection molding tools and tool inserts, based on reactive silicon-containing precursor polymer, such as polysilazanes-containing polymer or siloxane-containing polymer, combined with a variety of optional additives to impart different characteristics to the printed part. The coating of 3D printed parts enhances the surface properties, such as lowering the surface roughness, altering the aesthetics, and enhancing the thermomechanical properties, especially for injection molding applications. Enhancements to the thermomechanical properties include, but are not limited to, increased strength, increased stiffness, mechanical fatigue resistance, reduced surface roughness (e.g. striations, defects), coefficient of thermal expansion (CTE) reduction, increased thermal fatigue resistance and others.

Embodiments of the described methods and articles may provide one or more of the following:

The reactive silicon-containing precursor polymer deposits a silica or silica-like precursor layer onto digitally manufactured, e.g., 3D printed articles, and after reaction with oxygen-containing reactants, leaves a glossier, smoother and harder finish then may otherwise exist. This is applicable to digitally manufactured articles made of metals, polymers, dielectrics, ceramics, ceramic-filled polymers, semiconductors, and/or combinations thereof.

When applied to injection molding tooling, these coating can appreciably aid the mold release process by (1) serving as a permanent or semi-permanent release agent, (2) reducing the surface energy and associated release force of an injected polymer from the mold, and (3) reducing the surface roughness from the printing process to further reduce the required release force.

This coating makes the surface of the 3D printed part more durable. When applied to injection molding tooling this durability can result in a higher number of injection runs per mold before failure, which is a very significant result in the industry.

This coating makes the surface of the 3D printed part smoother. When applied to injection molding tooling this smoothness can result in smoother injection molded parts generated from this tooling. Surface finish of this injection molding parts is critical to customers.

This coating makes the surface of, e.g., SLA/DLP printed parts maintain high resolution and integrity at higher temperatures, minimizing CTE effects. When applied to injection molding tooling this high temperature stability can result in better maintaining the mold geometry at the higher temperatures experienced during the injection of molten polymer.

The coating of silica onto digitally printed parts may enhance the surface properties, including lowering the surface roughness, altering the aesthetics, and enhancing the thermomechanical properties, e.g., for injection molding applications.

Suitable coatings may be formed by reacting reactive silicon-containing precursor polymers with oxygen and water in the air to form coatings of silica; suitable silica precursor materials are, for example, polysilazanes, perhydropolysilazanes, polydimethyldisilazane, and organic precursors containing di- and/or trialkoxysilazane moieties.

The coatings described herein may be applied to 3D printed parts made of metal, polymer, dielectric, ceramic, semiconductor and/or combinations thereof. The reactive silicon-containing precursor-based coatings can improve the durability of 3D printed parts, especially at high temperature, by creating a covalently bonded and fully integrated glass-like layer that encompasses the printed part. Further, these coatings work to smooth the surface of a printed part which reduces surface-based stress concentrations during usage as well as alters aesthetics by making the part appear visually glossier. A glossy finish is often important with 3D printed parts for aesthetics with many 3D printing processes relying on solvent-based or thermal-based processes to try to smooth a printed part with time and energy consuming post-processing steps.

Referring to FIG. 1, such coating materials can achieve high adhesion to the surface of 3D printed parts. As illustrated, part 10 is formed by DLP composite additive manufacturing and is uncoated. Part (b) is a coated version of the same part, coated in accordance with an embodiment of the invention. Part 10' is visibly smoother with a glossier finish, as well as with more mechanical robustness.

In some embodiments, these reactive silicon-containing precursor polymer-based coatings, e.g., silazane-based coatings, are useful for 3D printing injection molding tooling and tooling inserts. Specifically, silazane-coated 3D printed molds appreciably aid the mold release process by (1) serving as a permanent or semi-permanent release agent, (2) reducing the surface energy and associated release force of an injected polymer from the mold (shown in FIG. 2), and (3) reducing the surface roughness from the printing process to further reduce the required release force.

In particular, FIG. 2 illustrates how the release force of an injected article made by 3D printed mold decreases when the molding tooling has a polysilizane-based coating, in comparison to an uncoated molding tooling. To create the data in this figure, two identically printed mold inserts were tested for the strength required to demold the injected plastic part. One insert was coated with polysilazane and the other was left uncoated. The strength needed to demold the injected plastic part is much greater when using the uncoated insert instead of the coated insert, e.g., approximately 10 times greater.

Also, referring to FIG. 3, a coated injection mold tool insert 30 has a glossy sheen that is useful as a release agent.

Moreover, coating printed molds with the disclosed reactive silicon-containing precursor polymer-based coatings increases mold durability, which may result in a higher number of injection runs per mold before failure. Being able to increase the number of parts per mold increases the number of potential applications.

Further, 3D printed parts with coatings formed from disclosed reactive silicon-containing precursor polymers may be smoother when an overcoat is applied over the striations and other surface defects from the printing process. This smoothening also translates to injection molded parts generated from this tooling. Surface finish of this injection molding parts is critical to certain users. For example, users who want to injection mold aerodynamic parts are highly sensitive to surface roughness of the end part, as it greatly affects surface drag. Furthermore, polysilazanes-based coatings make the surface of SLA/DLP printed injection molding tooling more stable at higher temperatures. This stability can come in the form of higher modulus as well as reduction of surface stress concentrations during usage. This geometric and mechanical stability can result in better maintenance of the mold geometry during the injection of molten polymer.

The coating can also provide a hydrophilic or fluorous surface chemistry that is anti-stick to most relevant injection molding plastics. These interactions can be further enhanced with additional surface chemistry to the polysilazane coating including, but not limited to, silane chemistries. These silane chemistries can be incorporated into the polysilazane coating process or can be applied in a post-processing step.

In addition, once the polysilazanes-based coating is applied to the printed article, additional release agents can be used in tandem with the surface coating. For example, silicone-based release sprays can be additionally applied to a coated 3D printed mold to enhance the mold's performance by decreasing the release force and increasing the number of injection cycles before mold failure.

Details of Coating Process

In an embodiment, a 3D printed article may be coated as follows. An article, e.g., an injection mold tool, is formed by digital manufacturing, e.g. by additive manufacturing and/or laminated object manufacturing. Examples of additive manufacturing include vat polymerization (e.g., stereolithography), material extrusion (e.g., fused filament fabrication (FFF), binder jetting, powder bed fusion (e.g., selective laser sintering (SLS), and material jetting. Another example of digital manufacturing is laminated object manufacturing, e.g., selective deposition lamination, wet lamination, dry lamination, was lamination, and solventless lamination.

In some instances, subtractive manufacturing may be combined with additive manufacturing or laminated object manufacturing. Subtractive manufacturing includes, e.g., computer numerical control (CNC) milling, laser engraving, and negative photoresist polymer lithography.

The defining characteristics of articles formed by digital manufacturing include layer-by-layer deposition, or particle binding and sintering. These articles are clearly identifiable due to striations on the surface of the part, a coarse texture due to particle size, or unique internal features (lattices or channels, for example) that are only manufacturable via additive manufacturing. Surface striations may have an average height ranging from, e.g., 250 nm to 100 microns.

Any residue from formation of the article, i.e., the 3D printed injection mold tool, may be cleaned off with, e.g., organic solvent, soap, or an adequate mechanical removal method (such as wiping with a cloth or through ultrasonication). A surface of the article may then be coated with a reactive silicon-containing precursor polymer by, e.g., vapor deposition, solution deposition, and/or application of solid material, in accordance with embodiments of the invention.

The reactive silicon-containing precursor polymer may include, e.g., a silazane-containing polymer and/or a siloxane-containing polymer. It may include reactive and/or unreactive silicone. It may include a solid powder or a liquid. In some embodiments, it may include polysilazane dissolved in one or two solvents. For example, the first solvent may be 2-butanone and the second solvent may include a reactive silicone and/or an unreactive silicone.

The reactive silicon-containing precursor polymer may include a particulate additive, such as one or more of silica-, ceramic-, or metal-oxide bead particles. Examples of suitable additives include silica spheres, chopped glass, and fumed silica. Particulate additives generally serve two purposes. One purpose is to modify the theology of the coating to optimize for a particular coating process. Another purpose is to impart a particular texture to the tool, that one may not otherwise accomplish via printing conditions, to produce a specific texture on the final injection molded part.

The reactive silicon-containing precursor polymer may include a chemistry modifier, such as a functional silane, e.g., Fluorolink S10. A chemical modifier may be added for one or more several purposes. One purpose is to express a unique chemistry on the surface for modifying adhesion or Hansen-solubility parameter (wettability). Another purpose is to modify the bulk properties of the coating, especially crack resistance through thermal cycling. An example of this is a reactive siloxane polymer. A third purpose is to attribute a specific chemical signal, such as a non-reactive fluorophore.

The reactive silicon-containing precursor polymer may include a pigment, e.g., cobalt oxide, titanium dioxide, iron oxide, copper flake, and/or carbon black, thereby enabling determination of the color of the finished part.

The reactive silicon-containing precursor polymer may include a rheology modifier, e.g. fumed silica, to tailor the viscosity and rheology of the coating solution. Modification of the coating rheology enables optimization of coating thicknesses under different coating methods.

In an embodiment, the coating may be formed on the article by solution deposition. Here, the article's surface may be coated by, e.g., fully submerging the article into the coating solution described below. The article remains submerged for a suitable period of time, long enough to allow the ingress of solvent and polymer into the surface of the printed part on the sub-micron-scale e.g., 10-20 seconds, removed from the solution, and may then be drip dried with the aid of an air gun to rid the article of any drips or pools before drying completely. The reactive silicon-containing precursor polymer may then be treated to form a silica-containing coating, thereby forming a coated digitally manufactured part. For example, treating the polymer may include exposing the polymer to an oxygen-containing humid environment for a predetermined time and temperature. For example, the polymer may be dried at room temperature and cured at an elevated temperature, e.g., at 60-100° C. in a >25% humidity atmosphere for 2 hours.

Alternative coating methods may be used. For example, a spray coating may be applied to coat the digitally manufactured part. The spray coating may be best achieved with an airless spray device, and applied to achieve a thickness that is, for example, 1 nm to 500 microns, e.g., 250 nm to 75 microns or 1 micron to 50 microns.

The part may be subjected to high rotary forces, such as a high revolutions per minute (RPM) rotation, to remove excess coating solution, prior to drying.

Once a digitally manufactured part undergoes this process, its surface has a clear and glossy appearance, which increases hardness and decreases surface texture. The resulting coating is between a nanometer, e.g., tens of nanometers thick, up to 500 microns, e.g., 50 or 75 microns thick, and is clearly identifiable under a scanning electron microscope. Additional analysis by X-ray photoelectron spectroscopy (XPS), for example, allows for a composition analysis typically reveals a thin coating of $SiO_2$ on the surface of the part, which is of a different composition than the body of the part.

A hardness of the coating may range from, e.g., 4 GPa to 30 GPa.

The coating may have a surface roughness $R_a$ of 0.5 microns to 25 microns, i.e., significantly less than striations typically present in digitally manufactured articles, which generally range from 35 microns-150 microns.

The coating may have a water wettability contact angle selected from a range of 0° to 180°. This range includes all possibilities, from poor adhesion to most materials (excellent for molding application and anti-fouling properties) to excellent adhesion to some materials (important for end use parts that may need to be glued to other components).

The coating may include silica. Silica can impart coating solution rheology modification, an engineered surface texture in the final cure coating, and/or impart a higher degree of scratch-resistance to the final coating.

Figure 4:
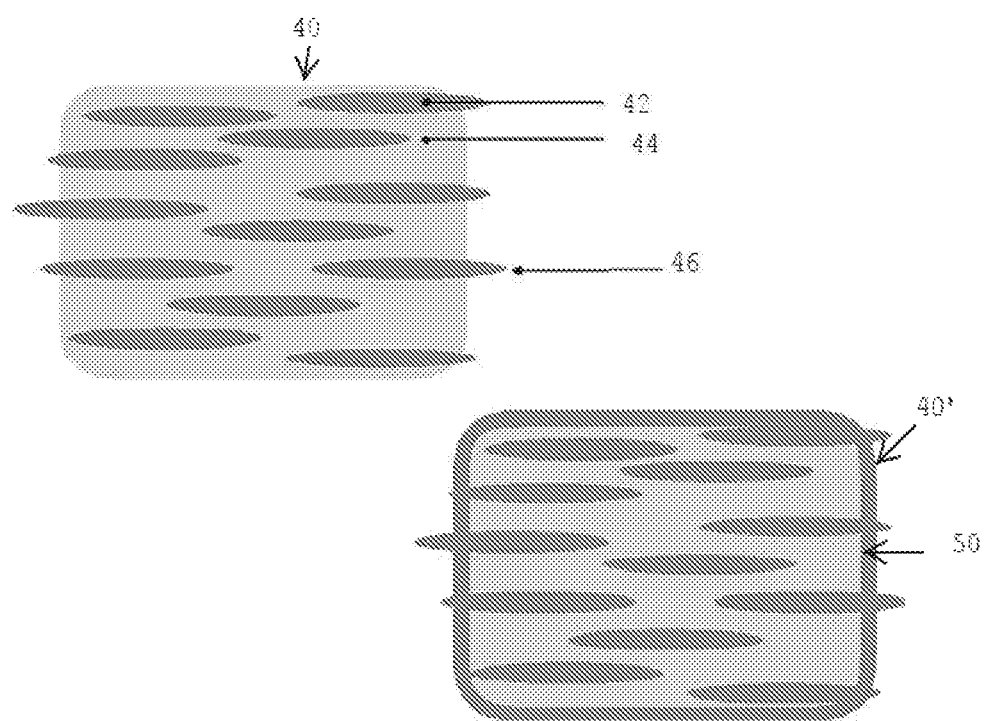
FIG. 4 is a schematic diagram illustrating a structure of a digitally manufactured part before and after being coated in accordance with an embodiment of the invention.

Referring to FIG. 4, a digitally manufactured article 40, as printed, may include fibers 42 of, e.g., glass, ceramic, carbon, metal, silica, metal oxide, etc. disposed in a resin 44 (e.g., acrylate/methacrylate). The fibers extend beyond the surface of the resin and are exposed. These exposed fibers define striations 46 and may help anchor a silica coating through covalent bonding. After the digitally manufactured article 40 is coated to form a coated digitally manufactured part 40' in accordance with embodiments of the invention, the coating 50 is anchored to the article and the striations are reduced in magnitude.

Preparation of Coating Solution

An exemplary coating solution is prepared by combining a perhydro-polysilazane solution (such as Durazane 2850 from Merck EMD which comes as a ~22% solids solution in di-n-butyl ether) with a compatible solvent such as 2-butanone or methyl ethyl ketone to achieve a desired thickness of coating. The composition may include 1 to 99 wt % perhydro-polysilazane solution, and 1 to 99 wt % solvent; a suitable ratio of polysilazane to solvent may be about 1:1 by weight. In an embodiment, no dilution is made.

Additives to affect surface sheen, mechanical properties, wear properties, aesthetics and surface chemistry can be added at this time and mixed used a mechanical mixer. Examples of such additives are discussed above and may include, e.g., spherical silica with diameters in the range of 1-75 microns from Evonik to create texture, Fluorolink S10 from Solvay to develop a perfluorinated surface, and reactive silicone oils such as HMS-11 from Gelest to reduce the risk of cracking or brittle failure.

Another exemplary composition may include 1 wt % to 99 wt %, e.g., 2 wt % to 75 wt % polysilazane such as Durazane 2850; 0 wt % to 99 wt %, e.g., 1 wt % to 99 wt % solvent of methyl ethyl ketone; and 1 wt % to 15 wt %, e.g., 0.1 wt % to 10 wt % of an additive such as bis (triethoxysilane) perfluoropolyether (available as Fluorolink S10). A suitable ratio of polysilazane to solvent to additive may be about 6:5:1 by weight.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method for forming a coated digitally manufactured article, the method comprising:
    forming a digitally manufactured article by vat polymerization, the formed digitally manufactured article having at least one surface with a plurality of exposed fibers extending therefrom,
    wherein forming a digitally manufactured article by vat polymerization occurs using at least one of an acrylate resin that includes ceramic fibers or a methacrylate resin that includes ceramic fibers, and wherein the plurality of exposed fibers comprise at least some portion of at least one of the ceramic fibers of the acrylate resin or the ceramic fibers of the methacrylate resin;
    coating the at least one surface of the formed digitally manufactured article with a reactive silicon-containing precursor polymer; and
    treating the polymer to form a silica-containing coating, thereby forming the coated digitally manufactured article,
    wherein the silica-containing coating covalently bonds with itself and covalently bonds with the at least some of the plurality of exposed fibers of the digitally manufactured article.

2. The method of claim 1,
    wherein the coating is hydrophilic,
    wherein a water wettability contact angle is in the range of 0° to 180°, and
    wherein a thickness of the reactive silicon-containing precursor polymer is in the range of 1 nanometer to 50 microns.

3. The method of claim 1, wherein the reactive silicon-containing precursor polymer coating comprises a silazane-containing polymer.

4. The method of claim 3, wherein the composition of the coating comprises:
    1 wt % to 99 wt % polysilazane comprising perhydropolysilazane in di-n-butyl ether; and
    1 wt % to 99 wt % a solvent comprising methyl ethyl ketone.

5. The method of claim 4, wherein the composition of the coating further comprises 0.1 wt % to 15 wt % additive comprising bis(triethoxysilane) perfluoropolyether.

6. The method of claim 1, wherein the reactive silicon-containing precursor polymer comprises a siloxane-containing polymer.

7. The method of claim 1, wherein coating the at least one surface comprises at least one of spray coating the article with the reactive silicon-containing precursor polymer or submerging the article in the reactive silicon-containing precursor polymer.

8. The method of claim 1, wherein the reactive silicon-containing precursor comprises a pigment, the pigment comprising at least one of cobalt oxide, titanium dioxide, iron oxide, copper flake, or carbon black.

9. The method of claim 1, wherein the reactive silicon-containing precursor comprises a particulate additive for imparting texture on the at least one surface of the digitally manufactured article, the particulate additive for imparting texture comprising at least one of silica spheres, chopped glass, or fumed silica.

10. The method of claim 1, wherein the digitally manufactured article is an injection mold tool.

11. The method of claim 1, wherein the reactive silicon-containing precursor polymer fills in at least one of defects or small holes on the at least one surface of the digitally manufactured article to which the reactive silicon-containing precursor polymer is coated, thereby resulting in a reduced surface roughness of the at least one surface.

12. A method for forming a coated digitally manufactured article, the method comprising:
    forming a digitally manufactured article by vat polymerization of resin, the resin including fibers, the formed digitally manufacturing article having at least one surface from which at least some portion of the fibers of the resin extend beyond such that they are exposed,
    wherein forming a digitally manufactured article by vat polymerization occurs using at least one of an acrylate resin that includes ceramic fibers or a methacrylate resin that includes ceramic fibers;
    coating the formed digitally manufactured article with a reactive silicon-containing precursor polymer; and
    treating the polymer to form a silica-containing coating, thereby forming the coated digitally manufactured article,
    wherein the silica-containing coating covalently bonds with at least one of itself or covalently bonds with the at least some portion of the fibers of the resin that extend beyond the at least one surface of the digitally manufactured article.

13. The method of claim 12,
    wherein the coating is hydrophilic,
    wherein a water wettability contact angle is in the range of 0° to 180°, and
    wherein a thickness of the reactive silicon-containing precursor polymer is in the range of 1 nanometer to 50 microns.

14. The method of claim 12, wherein the reactive silicon-containing precursor polymer comprises a silazane-containing polymer.

15. The method of claim 14, wherein the composition of the coating comprises:
    1 wt % to 99 wt % polysilazane comprising perhydropolysilazane in di-n-butyl ether; and
    1 wt % to 99 wt % a solvent comprising methyl ethyl ketone.

16. The method of claim 15, wherein the composition further comprises 0.1 wt % to 15 wt % additive comprising bis(triethoxysilane) perfluoropolyether.

17. The method of claim 12, wherein the reactive silicon-containing precursor polymer comprises a siloxane-containing polymer.

18. The method of claim 12, wherein the reactive silicon-containing precursor comprises at least one of cobalt oxide, titanium dioxide, iron oxide, copper flake, carbon black, silica spheres, chopped glass, or fumed silica.

19. The method of claim 12, wherein the reactive silicon-containing precursor polymer fills in at least one of defects or small holes on the at least one surface of the digitally manufactured article to which the reactive silicon-containing precursor polymer is coated, thereby resulting in a reduced surface roughness of the at least one surface.

\* \* \* \* \*